US012710239B2

(12) United States Patent
Groll et al.

(10) Patent No.: US 12,710,239 B2
(45) Date of Patent: Aug. 18, 2026

(54) ELECTROMECHANICAL CYLINDER, COOLING ASSEMBLY, SYSTEM, AND METHOD

(71) Applicant: Ewellix AB, Partille (SE)

(72) Inventors: Arnaud Groll, Chambery (FR); Yoann Monterymard, Chambery (FR); Laurent Benoit, Chambery (FR); Quentin Monvaillier, Chambery (FR)

(73) Assignee: Ewellix AB, Gothenburg (SE)

( * ) Notice: Subject to any disclaimer, the term of this patent is extended or adjusted under 35 U.S.C. 154(b) by 161 days.

(21) Appl. No.: 18/585,636

(22) Filed: Feb. 23, 2024

(65) Prior Publication Data

US 2024/0288231 A1 Aug. 29, 2024

(30) Foreign Application Priority Data

Feb. 24, 2023 (DE) ..................... 10 2023 104 546.6

(51) Int. Cl.
*F28F 9/02* (2006.01)
*F16H 25/20* (2006.01)
*F16H 25/24* (2006.01)
*F28F 5/00* (2006.01)

(52) U.S. Cl.
CPC ........... *F28F 9/0239* (2013.01); *F16H 25/24* (2013.01); *F28F 5/00* (2013.01); *F16H 2025/2031* (2013.01)

(58) Field of Classification Search
CPC .... F28F 9/0239; F28F 5/00; F28F 5/02; F28F 19/008; F16H 25/24; F16H 2025/2031; F16H 57/0412; F16H 57/0497; F27D 15/028; F27B 7/386
USPC .................................................... 165/104.25
See application file for complete search history.

(56) References Cited

U.S. PATENT DOCUMENTS

2018/0172139 A1* 6/2018 Yamamoto ............. F16H 25/24

FOREIGN PATENT DOCUMENTS

| | | | |
|---|---|---|---|
| CN | 2589756 | Y | 12/2003 |
| CN | 203141213 | U | 8/2013 |
| CN | 107709832 | A | 2/2018 |
| DE | 4202510 | A1 | 8/1993 |
| DE | 102016209654 | A1 | 12/2017 |
| JP | 2001295909 | A | 10/2001 |
| JP | 2005305527 | A | 11/2005 |

* cited by examiner

*Primary Examiner* — Jon T. Schermerhorn, Jr.
(74) *Attorney, Agent, or Firm* — Laurence A. Greenberg; Werner H. Stemer; Ralph E. Locher

(57) ABSTRACT

A cooling assembly for an electromechanical cylinder has a rotary union unit with a coolant interface and at least one mounting point for mounting the rotary union unit to the electromechanical cylinder having a hollow screw shaft. Further, a hollow tube is fastened to the rotary union unit in a torque-proof manner, the hollow tube being in fluid communication with a first port of the coolant interface. The at least one mounting point is configured such that upon mounting the rotary union unit to the electromechanical cylinder, the hollow tube protrudes into a cavity of the hollow screw shaft and the cavity is in fluid communication with a second port of the coolant interface such that an inflow channel and a backflow channel are formed within the hollow screw shaft.

10 Claims, 3 Drawing Sheets

ELECTROMECHANICAL CYLINDER, COOLING ASSEMBLY, SYSTEM, AND METHOD

CROSS-REFERENCE TO RELATED APPLICATION

This application claims the priority, under 35 U.S.C. § 119, of German Patent Application DE 10 2023 104 546.6, filed Feb. 24, 2023; the prior application is herewith incorporated by reference in its entirety.

FIELD AND BACKGROUND OF THE INVENTION

The present invention relates to a cooling assembly for an electromechanical cylinder, an electromechanical cylinder containing a cooling assembly, a cooling system containing an electromechanical cylinder, and a cooling method for an electromechanical cylinder.

For moving and positioning machine parts, electromechanical cylinders are known. Such electromechanical cylinders convert rotational motion of an electric motor into translational motion by means of a linear unit. Such linear unit contains a ball or roller screw mechanism, for instance, wherein a corresponding rotatably mounted screw shaft is operationally coupled to a nut.

While the efficiency of ball or roller screw mechanisms is generally very high, a certain energy loss in form of heat generation e.g. due to inevitable friction cannot be prevented. In applications having high duty cycles such as dispensing or plastic injection, this heat generation can accumulate and lead to non-negligible material expansion. This may result in a loss of positioning accuracy or even cause damage to the electromechanical cylinder, in particular the linear unit.

This problem has been tackled by, for instance, generating an airflow or oil flow within the cylinder, or by utilizing an oil bath to dissipate heat. Other solutions are based on pumping a coolant through a bore in the screw shaft having an input on one end and an output on the other end, or cooling the nut body. However, these solutions have certain disadvantages. For example, cooling by airflow is inefficient compared to cooling by oil, but using oil requires very tight sealing and oil flow management inside the system. Oil baths are very dependent on system positioning and pressure variation inside the system, and cooling of the nut body may cause jamming of the linear unit due to different thermal expansion of the nut body compared to the screw shaft.

SUMMARY OF THE INVENTION

It is therefore an object of the present invention to enhance cooling of an electromechanical cylinder, in particular to provide cooling in a more efficient and/or flexible manner.

This object is solved by the cooling assembly, the electromechanical cylinder, the cooling system, and the cooling method according to the independent claims.

Preferred embodiments are subject to the dependent claims and the following description.

A cooling assembly for an electromechanical cylinder according to a first aspect of the invention includes a rotary union unit having a coolant interface, e.g. for receiving a coolant, preferably at a predetermined temperature, and for emitting the coolant, preferably at a temperature higher than the predetermined temperature, and at least one mounting point for mounting the rotary union unit to an electromechanical cylinder having a hollow screw shaft, particularly to a housing of the electromechanical cylinder. Further, a hollow tube is fastened to the rotary union unit in a torque-proof manner, the hollow tube being in fluid communication with a first port of the coolant interface. The at least one mounting point is configured such that upon mounting the rotary union unit to the electromechanical cylinder, the hollow tube protrudes into a cavity of the hollow screw shaft and the cavity is in fluid communication with a second port of the coolant interface such that an inflow channel and a backflow channel is formed within the hollow screw shaft.

An aspect of the invention is based on the approach of providing a screw shaft of an electromechanical cylinder with an inflow channel and a backflow channel. Advantageously, a coolant can therefore flow into the screw shaft from one end via the inflow channel, and return to the same end via the backflow channel. Accordingly, the inflow and backflow channel preferably run along the same length of the screw shaft. Particularly, the coolant can circulate inside the screw shaft. This allows to increase cooling efficiency, because the coolant can absorb heat on both the way into and out of the screw shaft. At the same time, this allows to have both an inlet and an outlet at the same end of the screw shaft, facilitating interfacing the inflow and backflow channels with corresponding external coolant fluid lines and thus facilitating integration into a cooling circuit.

A possibility to provide a screw shaft with an inflow and a backflow channel is to attach a corresponding cooling assembly to the electromechanical cylinder having a hollow screw shaft. The cooling assembly preferably contains a rotary union unit having a first and a second port for coolant circulation. The first and second port may each act as inlet or outlet, respectively. Advantageously, a hollow tube is attached to a stationary, i.e. nonrotating, part of the rotary union unit. The hollow tube preferably forms the inflow channel by protruding into a cavity of the hollow screw shaft when the rotary union unit is attached to the electromechanical cylinder at one or more mounting points. At the same time, the backflow channel may be formed radially in between at least a section of the hollow tube and at least a section of an inner wall of the cavity within the hollow screw shaft. However, in the alternative, the backflow channel may be formed within the hollow tube. Accordingly, the inflow channel may be formed radially in between the tube and the inner wall of the cavity. This cooling assembly may be suited for retrofitting electromechanical cylinders and may facilitate easy and fast mounting. Further, the structure of the electromechanical cylinder, particularly the linear unit, does not have to be adapted to enable efficient cooling.

Preferred embodiments of the invention and further aspects thereof are described below, each of which, unless expressly excluded, may be combined with each other and with the aspects of the invention described below as desired.

In a preferred embodiment, the rotary union unit has a connecting channel axially extending within the rotary union unit, preferably within a rotating part thereof. This channel is preferably in fluid communication with the second port. Thereby, the connecting channel can connect the cavity with the second port upon mounting the rotary union unit to the electromechanical cylinder. The connecting channel may facilitate establishing a tightly sealed connection between the cavity, particularly the backflow channel, and the coolant interface, particularly the second port.

Axially extending in the sense of the present invention is preferably understood to extend in an axial direction, the axial direction being parallel to an axis of rotation of the screw shaft and/or the direction of movement of the nut.

In another preferred embodiment, the hollow tube is coaxial with the connecting channel and/or the cavity. Preferably, the hollow tube is arranged at least sectionally within the connecting channel and/or the cavity. I.e. at least a section of the hollow tube may reach at least sectionally through the connecting channel or the cavity, respectively. The coaxial arrangement allows for particularly easy fabrication of parts and/or facilitates assembly. However, in an alternative, the hollow tube can be eccentrically arranged within the channel and/or the cavity. This may create room within the channel or the cavity, respectively, for example for arrangement of cable channels or the like.

In yet another preferred embodiment, the hollow tube protrudes from the rotary union unit, in particular from the connecting channel. For example, the rotary union unit may comprise a housing including the coolant interface, sealing arrangements, and/or the connecting channel. The hollow tube may then be mounted to the rotary union unit, particularly coupled to the first port, within the housing such that a major part of the hollow tube protrudes therefrom. Thereby, the connection between the hollow tube and the first port is particularly well protected, and the hollow tube can protrude into the cavity of the screw shaft.

In yet another preferred embodiment, the rotary union unit contains a stationary part providing the coolant interface, particularly the first and second port, and a rotatable part for fastening the hollow screw shaft to the rotary union unit. Advantageously, the rotatable part is rotatably mounted on the stationary part. For example, the stationary part may include the housing. Thus, the stationary part preferably contains the at least one mounting point such that it is configured for attachment to the electromechanical cylinder. Preferably, the rotatable part forms or comprises at least a part of the connecting channel.

The electromechanical cylinder according to a second aspect of the invention comprises a linear unit having a screw shaft and a nut operationally coupled thereto. The screw shaft contains an inflow channel and a backflow channel in fluid communication therewith. Preferably, the inflow channel and backflow channel axially extend within the screw shaft along the same length. Accordingly, a coolant may be guided e.g. from a first axial end of the screw shaft to an opposite second axial end via the inflow channel and subsequently returned to the first axial end via the backflow channel. Interfacing the channels is thus only required at one end or region of the screw shaft. Interfacing is thus possible without interfering with the regular function of linear unit.

Further, a cooling assembly having a rotary union unit is provided, the rotary union unit having a coolant interface, e.g. for receiving a coolant, preferably at a predetermined temperature, and for emitting the coolant, preferably at a temperature higher than the predetermined temperature. The rotary union unit is arranged such that the inflow channel is in fluid communication with a first port or a second port of the coolant interface and the backflow channel is in fluid communication with the other one of said first or second port. Advantageously, the inflow channel is in fluid communication with the first or second port acting as an inlet, and the backflow channel is in fluid communication with the other of the first and second port acting as an outlet. Such electromechanical cylinder provides for very effective heat dissipation and can be cooled independently of linear unit or nut position, respectively. It is possible to prevent or at least reduce the risk of jamming associated with differential expansion of the nut and the screw shaft, e.g. by maintaining a small amount of backlash.

Preferably, the cooling assembly is the cooling assembly according to the first aspect of the invention.

In a preferred embodiment, the inflow channel and backflow channel axially extend in opposite directions within the screw shaft, i.e. the inflow channel and backflow channel guide the coolant in opposite directions within the screw shaft. For example, inflow and backflow channel each comprise openings at the first axial end of the screw shaft and are in fluid communication at the second axial end of the screw shaft. This enables coolant circulation within the screw shaft.

In another preferred embodiment, the inflow channel is coaxial with the backflow channel. Preferably, the inflow channel is at least sectionally arranged within the backflow channel. Alternatively, the backflow channel is at least sectionally arranged within the inflow channel. I.e. at least a section of the inflow or backflow channel may reach at least sectionally through the other one of the inflow and backflow channel. Such coaxial arrangement allows for particularly easy fabrication of parts and/or facilities assembly. However, in an alternative, the inflow or backflow channel can be eccentrically arranged within the other one of said inflow and backflow channel. This may create room within the screw shaft, for example for arrangement of cable channels or the like.

In yet another preferred embodiment, the screw shaft is a hollow screw shaft containing a, preferably axially extending, cavity. Further preferably, the cooling assembly contains a hollow tube fastened to the rotary union unit in a torque-proof manner, the hollow tube being in fluid communication with the first port and protruding into the cavity of the hollow screw shaft such that the volume within the hollow tube defines one of the inflow or backflow channel, and the volume between an outer surface of the hollow tube and an inner surface of the hollow screw shaft defines the other one of the inflow and backflow channel. By this means, the electromechanical cylinder can be assembled in a particularly easy manner.

In yet another preferred embodiment, the hollow tube is rotatably supported with respect to the screw shaft within the cavity by means of a tube rotary support, preferably arranged at a free end of the hollow tube. A free end of the hollow tube in the sense of the present invention is preferably to be understood as the end opposite to the end at which the tube is mounted to the rotary union unit, i.e. the outlet end of the hollow tube where coolant exits the hollow tube and is redirected into the backflow channel. For example, the hollow tube may be supported by a bearing assembly, a bushing assembly or a similar support assembly. By this means, the hollow tube can be stabilized, and a gap between the outer surface of the hollow tube and the inner surface of the cavity can be reduced down to e.g. 5 mm or less, preferably 2 mm or less, particularly preferred 1 mm or less.

In yet another preferred embodiment, the closed end of the cavity within the screw shaft comprises a deflection device for deflecting coolant exiting the inflow channel into the backflow channel. For example, an end face of the cavity may have a deflection surface. Alternatively, a deflection plate may be arranged in the cavity at the closed end. Such a deflection device may improve coolant flow within the screw shaft and particularly prevent or at least reduce pressure drops within the backflow channel.

In yet another preferred embodiment, a further rotary union unit having an inlet in fluid communication with the backflow channel and an outlet in fluid communication with the inflow channel is provided. Preferably, the inflow channel and the backflow channel are in fluid communication with the first and second port, respectively, of the coolant interface at the first axial end of the screw shaft. Additionally, the inflow channel and the backflow channel are in fluid communication with the inlet and outlet, respectively, of the further rotary union unit at the opposite second axial end of the screw shaft. This is particularly useful for long screw shafts, where the further rotary union unit allows integration of a tow heat exchanger. Accordingly, the temperature of coolant entering the backflow channel can be reduced.

In yet another preferred embodiment, the screw shaft has a protruding part protruding from a housing of the electromechanical cylinder into the rotary union unit mounted to a back end of the housing. This may facilitate assembly and secure a particularly tightly sealed connection between the backflow channel and the second port of the coolant interface. Particularly, such arrangement may be suited for a configuration of the electromechanical cylinder in which an electric motor is not arranged inline with the linear unit, but in a u-shaped configuration.

In yet another preferred embodiment, the rotary union unit is arranged within a housing of the electromechanical cylinder and contains a bearing assembly rotatably supporting the screw shaft. By this means, the rotary union unit may be well protected. Particularly, such arrangement will be suited for a configuration of the electromechanical cylinder in which an electric motor is arranged inline with the linear unit.

The cooling system according to a third aspect of the invention contains a linear actuator according to the second aspect of the invention, a heat exchanger for reducing the temperature of the coolant, and a circulator for circulating the coolant through the inflow channel and the backflow channel of the screw shaft. To this end, an inlet of the heat exchanger is in fluid communication with the first or second port of coolant interface the outlet of the rotary union unit, and an outlet of the heat exchanger is in fluid communication with the other one of the first and second port of the cooling interface, e.g. via the circulator. By means of this cooling system, the electromechanical cylinder can be operated reliably even during high duty cycles.

The cooling system may further contain an expansion device, for example a coolant tank, for compensation of thermal expansion of the coolant. By this means, a closed cooling circuit may be realised.

Alternatively or additionally, the cooling system may further contain a further heat exchanger in fluid communication with an inlet and an outlet of the further rotary union unit. This further heat exchanger may reduce temperature of the coolant after it has been guided through the inflow channel and before it enters the backflow channel. This is particularly advantageous when the screw shaft is longer than conventional screw shafts.

The method for cooling electromechanical cylinder according to a fourth aspect of the invention includes i) providing a coolant to a cooling interface of a rotary union unit of a cooling assembly for an electromechanical cylinder, ii) circulating the coolant from a first or second port of the coolant interface through an inflow channel of a screw shaft of an electromechanical cylinder, particularly an electromechanical cylinder according to the second aspect of the invention, the inflow channel being in fluid communication with the first or second port, and subsequently through a backflow channel of the screw shaft, preferably back to the rotary union unit, the backflow channel being in fluid communication with the inflow channel, and iii) receiving the coolant from the coolant interface via the other one of the first and second port. The other one of the first and second port being in fluid communication with the backflow channel. Preferably, heat generated by e.g. (repeated) movement of a nut operationally coupled to the screw shaft along the screw shaft is taken up by the coolant flowing through the inflow and backflow channel. Thus, the method allows to reliably and efficiently dissipate thermal energy from the linear unit of the electromechanical cylinder without interfering with regular operation of the linear unit.

The properties, features and advantages of the invention described above, as well as the manner in which they are achieved, will be explained in more detail in connection with the figures in the following description of examples. Where appropriate, the same reference signs are used in the figures for the same or corresponding elements of the invention. The examples serve to explain the invention and do not limit the invention to the combinations of features indicated therein, even with respect to functional features. Moreover, any of the features disclosed in the above description as well as in the examples below may be considered in isolation and suitably combined with the features of any of the above embodiments and their further aspects. In particular, each of the features described above and below may be combined alone or in conjunction with others of the described features of the cooling assembly according to the first aspect of the invention, the electromechanical cylinder according to the second aspect of the invention, the cooling system according to the third aspect of the invention, and the method according to the fourth aspect of the invention.

Other features which are considered as characteristic for the invention are set forth in the appended claims.

Although the invention is illustrated and described herein as embodied in a electromechanical cylinder, a cooling assembly, a system, and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
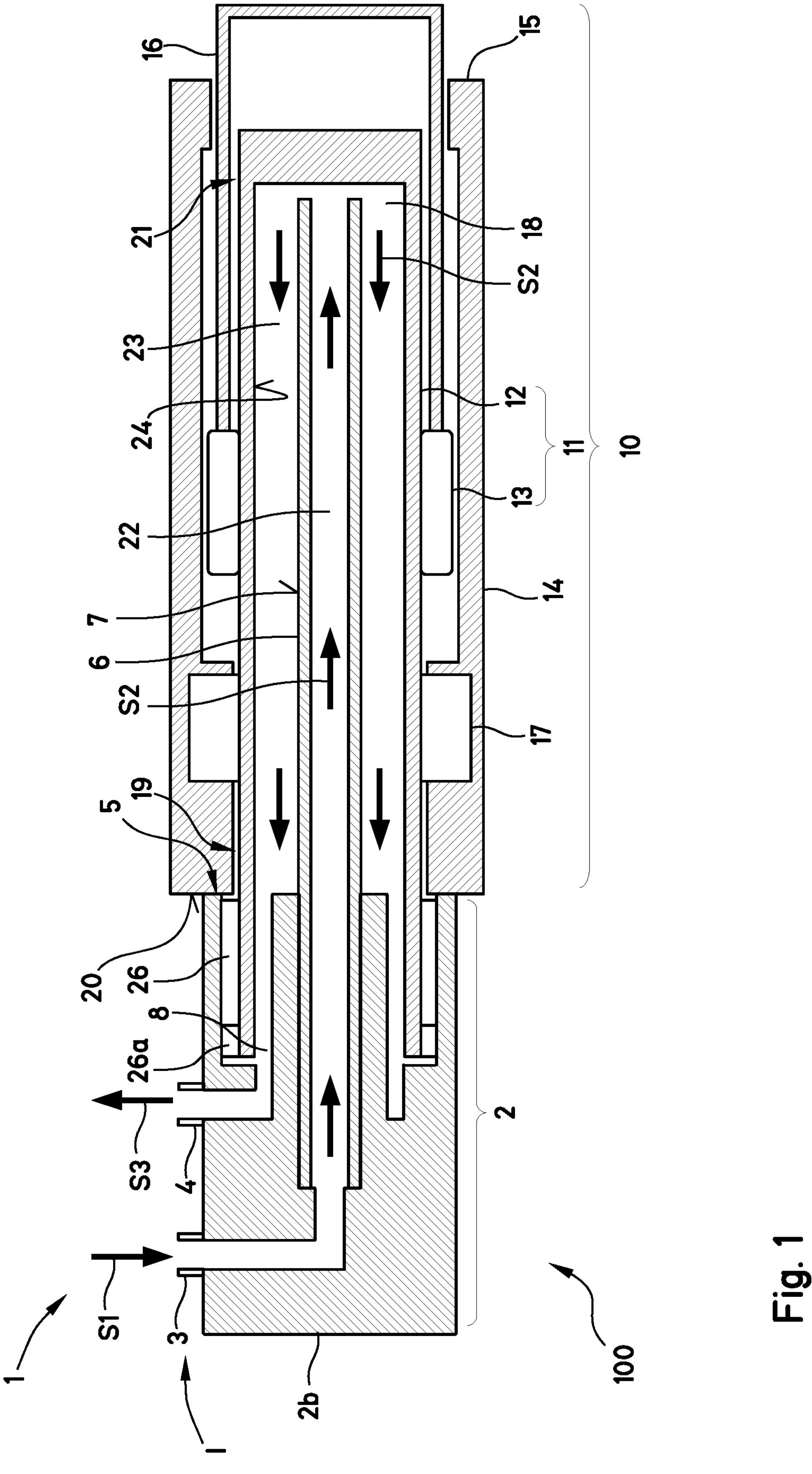
FIG. 1 is a diagrammatic, sectional view of an example of a cooling assembly for an electromechanical cylinder.

Referring now to the figures of the drawings in detail and first, particularly to FIG. 1 thereof, there is shown an example of a cooling assembly 1 for an electromechanical cylinder 10, containing a rotary union unit 2 having a coolant interface (I) for receiving and emitting a coolant via a first and second port 3, 4, and at least one mounting point 5 for mounting the rotary union unit 2 to the electromechanical cylinder 10. The cooling assembly 1 further contains a hollow tube 6 fastened to the rotary union unit 2 in a torque-proof manner, and a rotary support 26.

The electromechanical cylinder 10 contains linear unit 11 for converting rotational motion of a hollow screw shaft 12 into translational motion of a nut 13 operationally coupled to the hollow screw shaft 12. The linear unit 11 is arranged inside a housing 14, through which at a front end 15 protrudes a push tube 16 fixedly attached to the nut 13. The hollow screw shaft 12 is rotatably supported within the housing 14 by means of a bearing assembly 17. The hollow screw shaft 12 may be operationally coupled to an electric motor (cf. FIG. 2).

The hollow screw shaft 12 contains a cavity 18. The cavity 18 is open at a first axial end 19 of the screw shaft 12, the first axial end 19 extending from the housing 14 at a back end 20 thereof. Accordingly, the opening of the cavity 18 is accessible from outside of the housing 14. From the first end 19, the cavity 18 axially extends within the hollow screw shaft 12, preferably up to a region at a second axial end 21 of the screw shaft 12.

The at least one mounting point 5, e.g. a flange or threaded holes, is configured such that upon mounting the rotary union unit 2 to the electromechanical cylinder 10, particularly to the back end 20 of the housing 14, the hollow tube 6 protrudes into the cavity 18 and the cavity 18 is in fluid communication with the outlet 4 such that an inflow channel 22 and a backflow channel 23 is formed within the hollow screw shaft 12. Particularly, the inflow channel 22 may be defined by the volume within the hollow tube 6, and the backflow channel 23 may be defined by the volume between an outer surface 7 of the hollow tube 6 and an inner surface 24 of the cavity 18.

Further, the mounting point 5 is configured such that upon mounting, the part of the screw shaft 12 extending from the housing 14 is received by the rotary union unit 2. The screw shaft 12, particularly the first axial end 19 thereof, is rotatably supported within the rotary union unit 2 by means of a rotary support 26, e.g. a bearing assembly, a bushing assembly or the like.

The rotary union unit 2 comprises a connecting channel 8 for establishing fluid communication between the second port 4 and the cavity 18, particularly the backflow channel 23. The connecting channel 8 axially extends within the rotary union unit 2 and is defined radially between the inner surface 24 of the cavity 18, particularly the part extending from the housing 14, and a stationary part 2*b* of the rotary union unit 2. The connecting channel 8 is sealed by means of dynamic seal 26*a*.

The inflow and backflow channel 22, 23 allow for circulating a coolant through the screw shaft 12, as indicated by the arrows S1, S2, S3. These arrows S1, S2, S3 also represent steps of a method 100 for cooling the electromechanical cylinder 10. In step S1, the coolant is provided to the first port 3 acting as an inlet. In step S2, the coolant is circulated from the first axial end 19 of the screw shaft 12 via the inflow channel 22 to the second axial end 21 of the screw shaft 12 and back via the backflow channel 23 to the first axial end 19. In step S3, the coolant is received from the second port 4 acting as an outlet.

Of course, the skilled person will appreciate that flow direction can easily be reversed. In this case, second port 4 acts as inlet and first port 3 acts as outlet. Accordingly, the inflow channel 22 would be defined radially between the tube 6 and the inner surface 24, and the backflow channel 23 would be defined within the tube 6.

Figure 2:
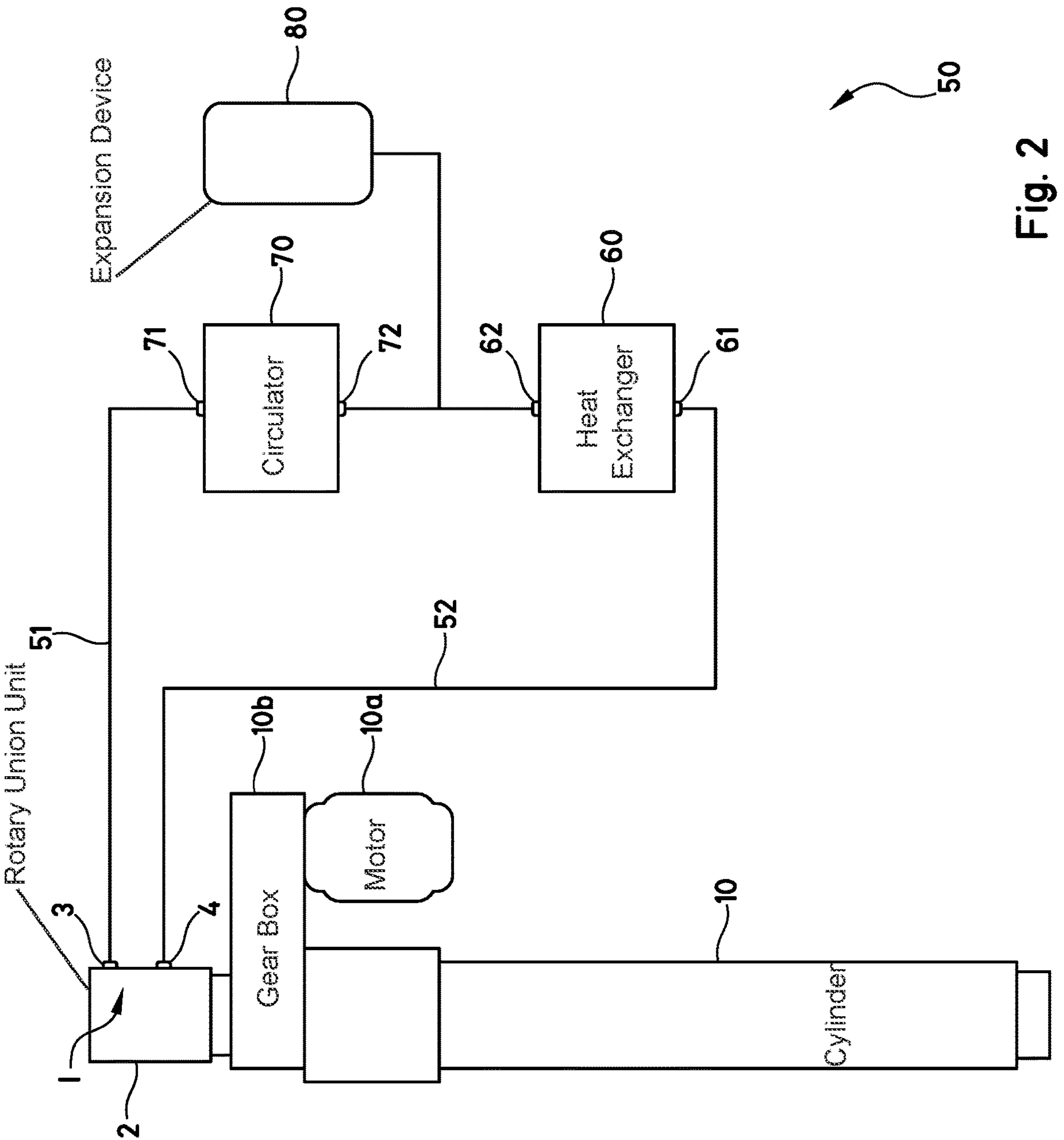
FIG. 2 of a block diagram of an example of a cooling system.

FIG. 2 shows a cooling system 50 containing an electromechanical cylinder 10, a heat exchanger 60, a circulator 70, e.g. a pump, and an expansion device 80, e.g. a coolant tank. The electromechanical cylinder 10 contains a motor 10*a* operationally coupled to a screw shaft via a gear housed in a gearbox 10*b* in a so-called u-configuration. The cylinder 10 further contains a cooling assembly (not referenced) including a rotary union unit 2, by means of which an inflow channel and a backflow channel of the screw shaft are in fluid communication with an inflow line 51 or an outflow line 52, respectively.

Specifically, the outflow line 52 connects a second port 4 of a coolant interface I of the rotary union unit 2 with an inlet 61 of the heat exchanger 60, and the inflow line 51 connects a first port 3 of the coolant interface I with an outlet 71 of the circulator 70. Additionally, an outlet 62 of the heat exchanger 60 is connected to an inlet 72 of the circulator 70. Thus, the heat exchanger 60 may provide coolant at a predetermined temperature, which is pumped by the circulator 70 to the first port 3. While circulating through the inflow channel and the backflow channel within the screw shaft, the coolant takes up heat generated by the cylinder 10 during its operation such that the coolant exits the second port 4 above the predetermined temperature. Subsequently, the heat can be drawn from the coolant again in the heat exchanger 60.

The expansion device 80 secures that thermal expansion of the coolant associated with an uptake of thermal energy does not damage any of the components of the system 50, by providing volume into which the coolant can expand.

Depending on the desired flow direction within the cylinder 10, the outflow line 52 may alternatively be connected to the first port 3, and the inflow line 52 may alternatively be connected to the second port 4.

Figure 3:
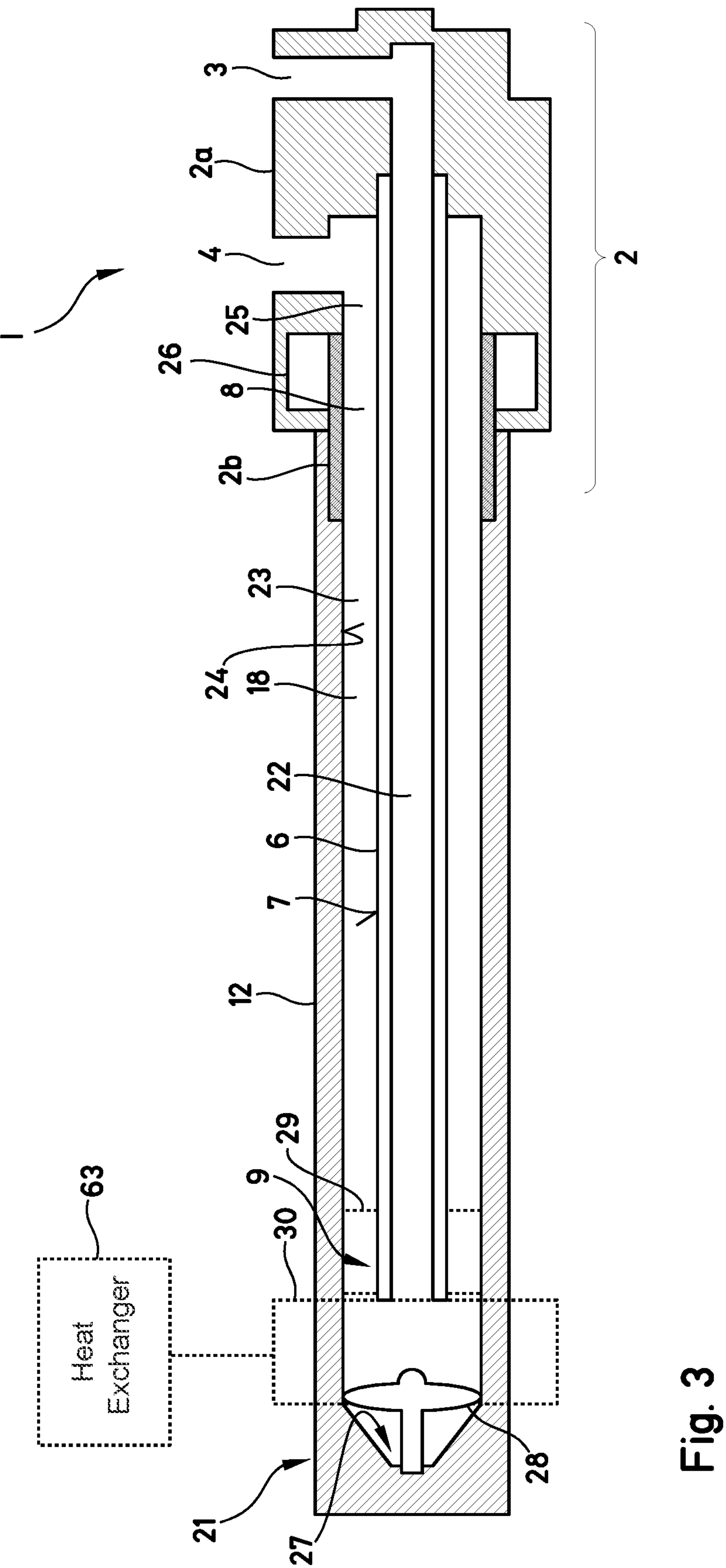
FIG. 3 is a diagrammatical, sectional view of an example of a screw shaft coupled to a rotary union unit.

FIG. 3 shows an example of a screw shaft 12 coupled to a rotary union unit 2. The screw shaft 12 contains an inflow channel 22 defined by a hollow tube 6 fixedly attached at one end to the rotary union unit 2 within a cavity 25 of the rotary union unit 2. The other end of the hollow tube 6 protrudes into a cavity 18 of the screw shaft 12 so as to form a backflow channel 23 between an outer surface 7 of the hollow tube 6 and an inner surface 24 of the cavity 18. The inflow channel 22 is in fluid communication with a first port 3 of a coolant interface I of the rotary union unit 2, and the backflow channel 23 is in fluid communication with a second port 4 of the coolant interface I. The first port 3 accordingly acts as inlet, and the second port 4 acts as outlet.

The cavity 25 is open towards the screw shaft 12. The cavity 25 is preferably defined radially by a rotatable part 2*b* of the rotary union unit 2 at least in first section and/or by a stationary part 2*a* of the rotary union unit 2 in a second section. The rotatable part 2*b* may be rotationally mounted within the stationary part 2*a* by means of a rotary support 26, e.g. a bearing assembly, a bushing assembly or the like. Between the hollow tube 6 and the stationary part 2*a* and the rotatable part 2*b* in the first section or second section, respectively, a connecting channel 8 is formed for connecting the backflow channel 23 to the second port 4. For example, a first axial end 19 of the screw shaft 12 is mounted to the rotary union unit 2, e.g. screwed onto the rotatable part 2*b*, such that the cavity 18 and backflow channel 23 is axially in alignment with the cavity 25 or connecting channel 8, respectively.

At an outlet end 9 of the hollow tube 6, a tube rotary support 29 may be provided to rotatably support the hollow tube 6 against the screw shaft 12. The rotary support 29 may contain a bearing assembly, a bushing assembly or the like. Further, a closed end 27 of the cavity 18 comprises a deflection device 28, e.g. a corresponding deflection plate, for deflecting coolant exiting the inflow channel 22 into the backflow channel 23. Alternatively or additionally, a further rotary union unit 30 may be provided at a second axial end 21 of the screw shaft 12, wherein an outlet of the further rotary union unit 30 is in fluid communication with the inflow channel 22 and an inlet of the further rotary union unit 30 is in fluid communication with the backflow channel 23. This further rotary union 30 may be utilized to couple a further heat exchanger 63 to the inflow and backflow channels 22, 23, in order to enhance cooling in long screw shafts 12.

It is noted that instead of the hollow tube 6, the screw shaft 12 may comprise respective bores that form the inflow and/or backflow channels 22, 23, respectively. In this case, a part of the screw shaft 12 forming the inflow channel 22 is preferably attached to a further rotatable part of the rotary union unit 2 for coupling to the first port 3.

Additionally or alternatively, it is noted that first port 3 could as well act as outlet, while the second port 4 could act as inlet. In this case, flow direction through the screw shaft 12 would be reversed. Accordingly, inflow channel 22 would be defined radially in between the inner surface 24 of the cavity 18 and the outer surface 7 of the tube 6, and the backflow channel 23 would be defined within the tube 6.

The following is a summary list of reference numerals and the corresponding structure used in the above description of the invention.

LIST OF REFERENCE NUMERALS

1 cooling assembly
2 rotary union unit
2*a* stationary part
2*b* rotatable part
3 first port
4 second port
5 mounting point
6 hollow tube
7 outer surface
8 connecting channel
9 outlet end
10 electromechanical cylinder
10*a* motor
10*b* gearbox
11 linear unit
12 screw shaft
13 nut
14 housing
15 front end
16 push tube
17 bearing assembly
18 cavity
19 first axial end
20 back end
21 second axial end
22 inflow channel
23 backflow channel
24 inner surface
25 cavity
26 rotary support
26*a* dynamic seal
27 closed end
28 deflection device
29 tube rotary support
30 further rotary union unit
50 cooling system
51 inflow line
52 outflow line
60 heat exchanger
61 inlet
62 outlet
63 further heat exchanger
70 circulator
71 outlet
72 inlet
80 expansion device
100 method
S1-S3 method steps
I coolant interface

The invention claimed is:

1. A cooling assembly for an electromechanical cylinder having a hollow screw shaft defining a cavity therein, the cooling assembly comprising:

a rotary union unit having a coolant interface and at least one mounting point for mounting said rotary union unit to the electromechanical cylinder, said coolant interface having a first port and a second port; and a hollow tube fastened to said rotary union unit in a torque-proof manner, said hollow tube being in fluid communication with said first port of said coolant interface, wherein said at least one mounting point is configured such that upon mounting said rotary union unit to the electromechanical cylinder, said hollow tube protrudes into the cavity of the hollow screw shaft and a free end of the hollow tube is rotatably supported with respect to the screw shaft within the cavity by a tube rotary support, and the cavity is in fluid communication with said second port of said coolant interface such that an inflow channel and a backflow channel are formed within the hollow screw shaft.

2. The cooling assembly according to claim 1, wherein said rotary union unit has a connecting channel axially extending within said rotary union unit and being in fluid communication with said second port, said connecting channel connecting the cavity with said second port upon mounting said rotary union unit to the electromechanical cylinder.

3. The cooling assembly according to claim 2, wherein said hollow tube is coaxial with said connecting channel and/or the cavity, said hollow tube being disposed at least sectionally within said connecting channel or the cavity, respectively.

4. The cooling assembly according to claim 1, wherein said hollow tube protrudes from said rotary union unit.

5. An electromechanical cylinder, comprising:

a linear unit having a screw shaft and a nut operationally coupled thereto, wherein said screw shaft is a hollow screw shaft defining a cavity therein and said screw shaft has an inflow channel and a backflow channel in fluid communication therewith;

a cooling assembly having a rotary union unit, said rotary union unit having a coolant interface with a first port and a second port, wherein said rotary union unit is disposed such that said inflow channel is in fluid communication with said first port or said second port of said coolant interface and said backflow channel is in fluid communication with an other one of said first port or said second port;

said cooling assembly additionally including a hollow tube fastened to said rotary union unit in a torque-proof manner, said hollow tube protruding into said cavity of said hollow screw shaft; and a tube rotary support, wherein a free end of said hollow tube is rotatably supported with respect to said hollow screw shaft within said cavity by said tube rotary support.

6. The electromechanical cylinder according to claim 5, wherein said inflow channel is coaxial with said backflow channel, said inflow channel being at least sectionally disposed within said backflow channel or vice versa.

7. The electromechanical cylinder according to claim 5, wherein:

said hollow tube is in fluid communication with said first port and said hollow tube protrudes into said cavity of said hollow screw shaft such that a volume within said hollow tube defines one of said inflow channel or said backflow channel and a volume between an outer surface of said hollow tube and an inner surface of said hollow screw shaft defines an other another one of said inflow channel and said backflow channel.

8. The electromechanical cylinder according to claim 5, further comprising a further rotary union unit having an inlet in fluid communication with said backflow channel, an outlet in fluid communication with said inflow channel, wherein said inflow channel and said backflow channel are in fluid communication with said first port and said second port, respectively, of said coolant interface at a first axial end of said screw shaft and said inflow channel and said backflow channel are in fluid communication with said inlet and said outlet respectively, of said further rotary union unit at an opposite second axial end of said screw shaft.

9. A cooling system, comprising:

said electromechanical cylinder according to claim 5;

a heat exchanger for reducing a temperature of a coolant, wherein said heat exchanger having an inlet in fluid communication with said first port or said second port of said coolant interface of said rotary union unit and an outlet of said heat exchanger is in fluid communication with an other one of said first port and said second port of said coolant interface; and a circulator for circulating the coolant through said inflow channel and said backflow channel of said screw shaft.

10. A method for cooling an electromechanical cylinder, which comprises the steps of:

providing a coolant to a coolant interface of a rotary union unit of a cooling assembly for an electromechanical cylinder, wherein a free end of a hollow tube of the cooling assembly received by a cavity in a hollow screw shaft of the electromechanical cylinder is rotatably supported with respect to the screw shaft within the cavity by a tube rotary support;

circulating the coolant from a first port or a second port of the coolant interface through an inflow channel of a screw shaft of the electromechanical cylinder, the inflow channel being in fluid communication with the first port or the second port, and subsequently through a backflow channel of the screw shaft, the backflow channel being in fluid communication with the inflow channel; and receiving the coolant from the coolant interface via an other one of the first port and the second port, the other one of the first port and the second port being in fluid communication with the backflow channel.

* * * * *